T. W. BROOKS.
PISTON PACKING RING.
APPLICATION FILED MAY 8, 1918.
1,357,949.
Patented Nov. 9, 1920.
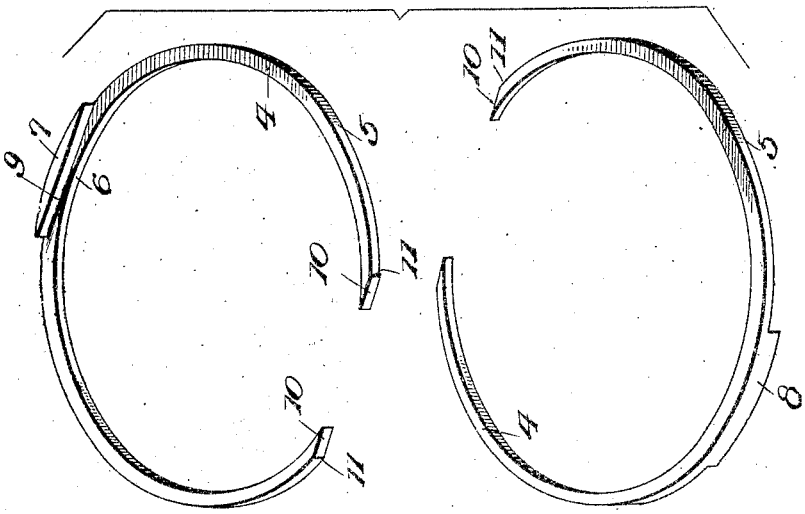
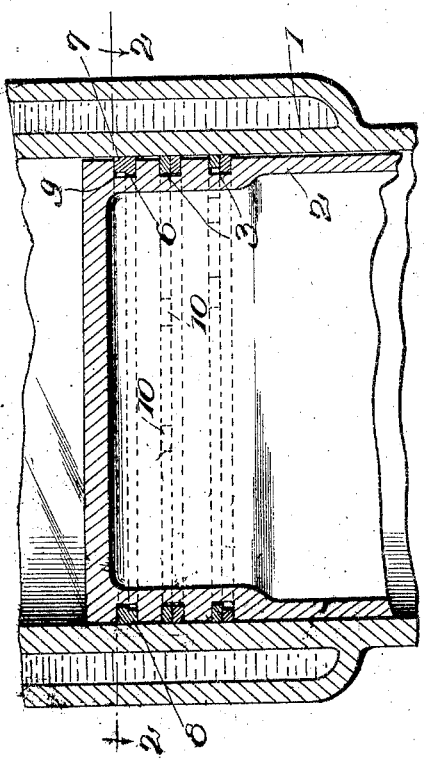
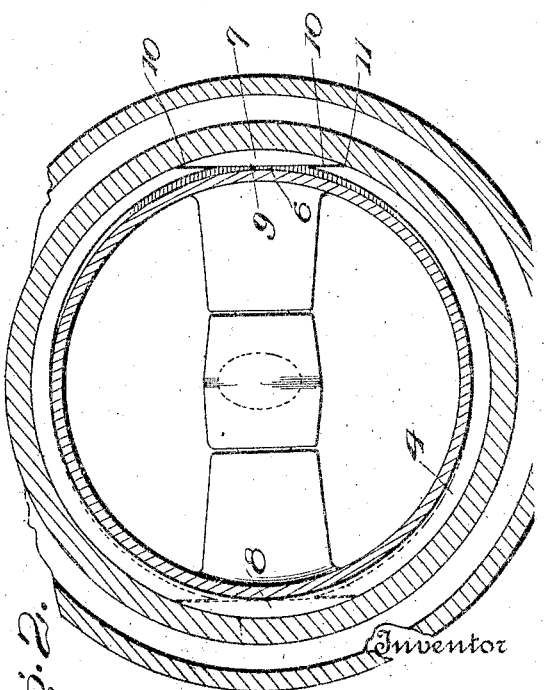
Inventor
T. W. Brooks.
By Lacy & Lacy, Attorneys

UNITED STATES PATENT OFFICE.

THOMAS WM. BROOKS, OF CLEVELAND, OHIO.

PISTON PACKING-RING.

1,357,949.	Specification of Letters Patent.	Patented Nov. 9, 1920.

Application filed May 8, 1918. Serial No. 233,186.

*To all whom it may concern:*

Be it known that I, THOMAS W. BROOKS, a citizen of the United States, residing at Cleveland, in the county of Cuyahoga and State of Ohio, have invented certain new and useful Improvements in Piston Packing-Rings, of which the following is a specification.

This invention relates to packing rings for the pistons of steam, gas, gasolene, kerosene, and other internal combustion engines, and the pistons of high and low pressure pumps.

One of the primary objects of the present invention is to provide a packing ring formed in sections so constructed that there will be no likelihood of leakage of the fluid acting upon the piston or upon which the piston acts, around the sides of the said piston.

Another object of the invention is to so construct the sections that when assembled and fitted into the cylinder with the piston by which they are carried, they will exert a uniform degree of pressure in all directions against the cylinder walls so that there will be no likelihood of the cylinder being worn unevenly as is likely to occur in the use of the ordinary diagonally split packing rings the pressure of which against the walls of the engine or pump cylinder varies throughout the circumference of the ring. In this connection the invention aims further to provide a piston packing ring formed in sections, the inner peripheries of the rings being eccentric to the outer peripheries and the rings being adapted to be assembled and held in such relative position at all times that the pressure of the rings against the cylinder walls will be equalized through the entire circumference of the wall.

A further object of the invention is to provide a form of joint between the ring sections which will positively preclude any scoring of the cylinder, the exterior surface of the composite ring being entirely smooth throughout the circumference thereof so that an unbroken surface is presented to the cylinder walls and there is an absence of any sharp corners or edges as in the case of the ordinary split ring.

A further object of the invention is to provide a piston packing ring of such construction that the same may be readily applied to any ordinary piston to which the ordinary packing ring is applicable, the ring of the present invention being designed to seat within the grooves ordinarily found in the conventional types of pistons, and without any alteration in the form of the walls of the said grooves.

Another object of the invention is to provide upon the sections of each ring, means constituting an abutment for the ends of the other ring section when the sections are assembled, the said abutment means serving effectually to prevent the ends of either section coming in direct contact with the cylinder walls which would be likely to cause scoring of the said walls.

In the accompanying drawings:

Figure 1 is a vertical sectional view through the upper portion of a piston and the cylinder in which the same is to reciprocate, the said view illustrating diametrical sections of the packing ring embodying the present invention, and the rings illustrated in the said figure being variously positioned so as to illustrate the cross-sectional contour of the ring sections at different points in the circumference thereof;

Fig. 2 is a horizontal sectional view on the line 2—2 of Fig. 1;

Fig. 3 is a group perspective view illustrating the two sections of the ring embodying the present invention, separated from each other.

In the drawings, the numeral 1 indicates an engine or pump cylinder and 2 the piston which is to reciprocate therein, the said piston being formed as usual with one or more circumferentially extending grooves 3 in which the packing ring or rings may be fitted, the rings being designed, of course, to expand against the inner surface of the cylinder wall 1.

The piston ring embodying the present invention is made up of two counterpart sections each indicated in general by the reference numeral 4. Each section 4 has substantially the form of an open annulus, the outer periphery of each section, indicated by the numeral 5, and the inner periphery of each section, indicated by the numeral 6, being eccentric to each other. Due to the eccentric relation of the inner and outer peripheries of each ring section, each ring section will taper from a point midway between its ends to its said ends, the taper being gradual as shown clearly in Fig. 2 of the drawings but depending upon the diameter of the ring as a whole. Of course, due to the taper of the ring in the direction of its ends, the ring will be more resilient at points approaching its ends than at its intermediate portion and it will be understood, of course, that when the two ring sections are assembled with their intermediate portions diametrically oppositely located, the ring as a whole will be of substantially equal resiliency throughout its entire circumference and, therefore, the ring as a whole will bear with an even degree of pressure at all points in its circumference against the inner surface of the cylinder wall 1.

Formed upon one face of each ring section 4 at the intermediate portion thereof, is a rib 7 of a height equal to the thickness of either ring section and having an outer arcuate face 8 forming an extension of the cylindrical surface described by the outer periphery 5 of the respective ring section. The opposite face of each rib, indicated by numeral 9, is chordal to the arc described by the outer periphery of the respective ring section, and between the inner face 9 of each rib and the inner circumference of the adjacent section is a supporting ledge or shoulder for the ends of the adjacent or mating section, as will be evident by reference to Figs. 2 and 3 of the drawings. Also by reference to the said figures, it will be observed that the ends of each ring section are spaced apart a distance somewhat less than the length of the face 9 of the rib 7, and that the said ends are beveled or cut at an angle to provide an inclined or beveled face 10, which face of each end is preferably smoothly finished. The ring sections 4 are of uniform thickness throughout except at the point of location of the respective ribs 7. In assembling the ring sections, the same are placed together in such manner that the end faces 10 of each section will abut and rest substantially flat against the chordal face 9 of the rib 7 of the other section. Initially, of course, the ring sections are outwardly sprung or expanded due to their inherent resiliency, but, of course, when the piston is fitted into the cylinder the sections will be compressed and at such time the outer edges of the faces 10, which edges are indicated by the numeral 11, will register exactly with the end edges of the chordal face 9 of the rib 7 against which the end faces 10 bear. Due to this fact and the fact that the faces 10 bear substantially flat against the chordal faces 9 of the ribs 7 and the outer of arcuate faces 8 of the ribs form continuations of the cylindrical surfaces described by the outer peripheries 5 of the ring sections, there will be no break whatsoever at any point in the circumference of the ring as a whole when the sections are properly assembled and a true cylinder surface will be presented to the inner surface of the cylinder wall 1. As a consequence there can be no leakage of fluid past the piston, and there are no sharp edges or corners presented to the cylinder walls liable to scratch or score the same or liable to wear the cylinder out of true.

Having thus described the invention, what is claimed as new is:

1. A piston packing ring comprising superposed sections of like formation, each section having substantially the form of an open annulus and each section being tapered from its intermediate portion in the direction of its ends, and a rib upon one face of each section having its inner face flat and chordal to the arc described by the section and spaced inwardly from the inner circumferential edge of said section to form a supporting ledge for the ends of the other section and constituting an abutment for said ends when the sections are assembled, the ends of said sections having flat beveled faces resting against the chordal faces of the ribs.

2. A piston packing ring comprising superposed resilient sections of like formation, each section having substantially the form of an open annulus and each section being provided intermediate its ends with a rib spaced inwardly from the inner circumferential edge of said section to form a supporting ledge for the ends of an adjacent section, the sections being designed to be assembled with their intermediate portions diametrically oppositely located and with the ribs of one section overlapping the open portion of an adjacent section and bearing against the ends thereof, each section having its inner periphery continuously eccentric to its outer periphery.

In testimony whereof I affix my signature.

THOMAS WM. BROOKS. [L. S.]